(12) United States Patent
Steinrück et al.

(10) Patent No.: US 6,390,121 B1
(45) Date of Patent: May 21, 2002

(54) CHECK VALVE CONTROLLED BY DIFFERENTIAL PRESSURE

(75) Inventors: Peter Steinrück, Hallstadt; Franz Paset, Kottingbrunn, both of (AT)

(73) Assignee: Hoerbiger Ventilwerke GmbH, Vienna (AT)

( * ) Notice: Subject to any disclaimer, the term of this patent is extended or adjusted under 35 U.S.C. 154(b) by 0 days.

(21) Appl. No.: 09/658,941

(22) Filed: Sep. 11, 2000

(30) Foreign Application Priority Data

Sep. 14, 1999 (AT) .............................................. 1573/99

(51) Int. Cl.⁷ .............................................. F16K 17/12
(52) U.S. Cl. ...................... 137/514; 137/532; 137/529; 239/533.2; 239/533.8
(58) Field of Search ............................... 137/529, 532, 137/514; 239/533.2, 533.8

(56) References Cited

U.S. PATENT DOCUMENTS

| 4,370,999 A | * | 2/1983 | Sebillotte | ................ 137/532 X |
| 4,465,231 A | * | 8/1984 | Sharp | ................... 239/533.8 X |
| 4,595,033 A | * | 6/1986 | Walsh, Jr. | .................... 137/529 |
| 5,234,023 A | * | 8/1993 | Lai | ............................. 137/489 |
| 5,941,745 A | * | 8/1999 | Kanno | ............... 123/73 AD X |

FOREIGN PATENT DOCUMENTS

FR         634501    * 5/1927    ................. 137/532

* cited by examiner

Primary Examiner—John Rivell
Assistant Examiner—Meredith H Schoenfeld
(74) Attorney, Agent, or Firm—Dykema Gossett PLLC

(57) ABSTRACT

A check valve (4) controlled by differential pressure, preferably in form of a disk valve, having a closing element (5) that impacts a valve seat (8) with a force by means of an elastic (resilient) element, preferably a closing spring (6). The closing element (5) is provided with an additional mass (11), which is larger in its amount than the mass of the closing element (5) itself to dampen the closing shock in a manner whereby the closing element (5) does not rebound even once or several times and also to dampen the opening shock of a valve of this type as a matter of course.

8 Claims, 1 Drawing Sheet

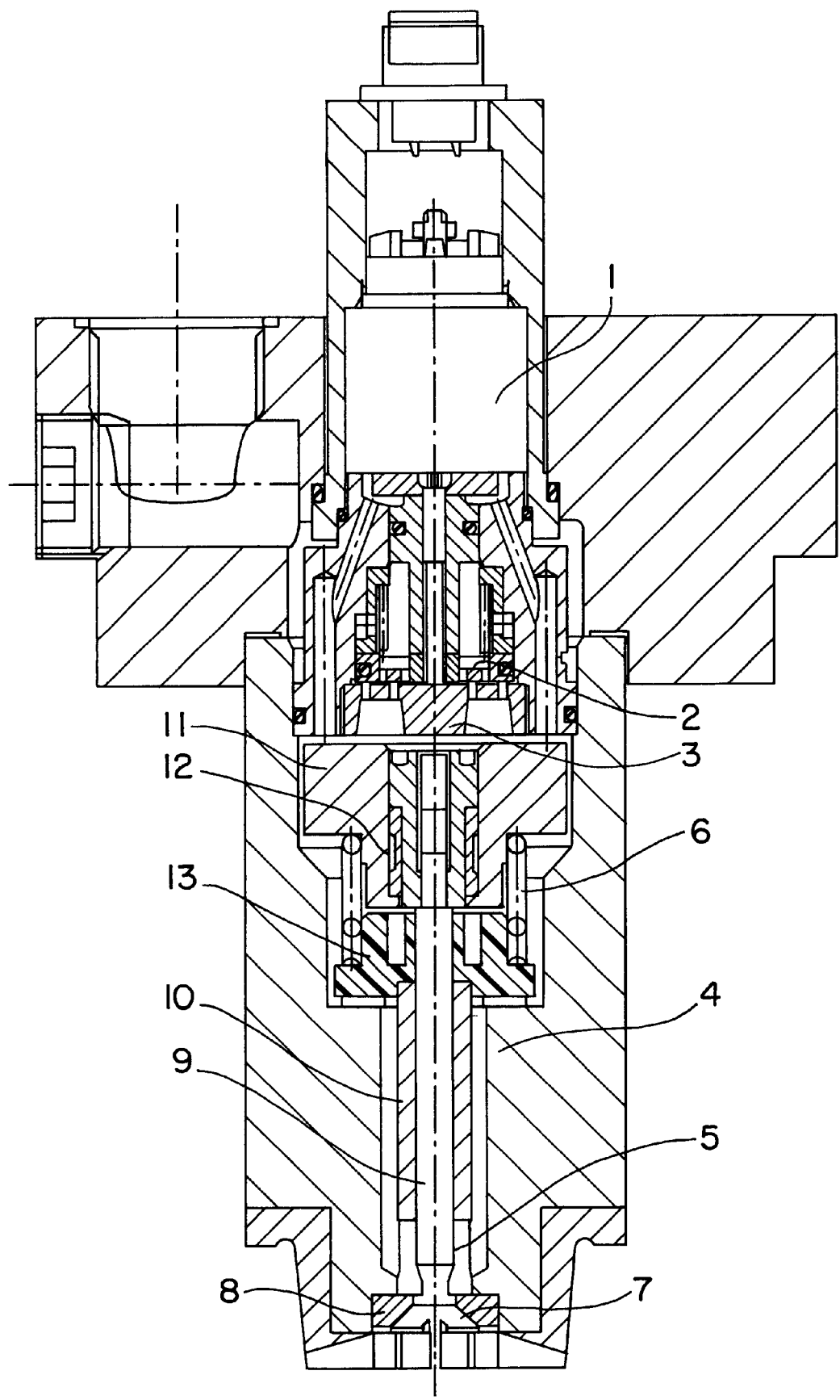

CHECK VALVE CONTROLLED BY DIFFERENTIAL PRESSURE

BACKGROUND OF THE INVENTION

1. Field of the Invention

The invention relates to a check valve controlled by differential pressure, preferably in the form of a disk valve, whereby a closing element impacts a valve seat with force by means of an elastic (resilient) element, preferably a closing spring.

2. The Prior Art

Aside of mechanically actuated valves for high-pressure fuel injection, particularly for large-volume combustion engines, hydraulically actuated valves have also been used in the past. One possibility to avoid the disadvantages of the above-mentioned (valve) solutions is high-pressure metering by means of a gaseous fuel injector, which has found increasing importance in recent times and which consists of a combination of an electro-magnetically actuated metering valve and a valve controlled by differential pressure. As long as the metering valve is closed, the check valve is pushed against the (valve) seat by its closing spring and dependably seals thereby the fuel delivery system from the combustion chamber. After opening of the metering valve, the valve body of the check valve is opened again by the applied gas pressure. Such gaseous fuel injectors are suitable for injections with currently common gas pressures of 1 to 3 bars above the suction pressure and they are suitable as well for high-pressure injections of 20 to 60 bars above the suction pressure. However, the traditional (valve) solutions are marked with the disadvantage of a free movement of the closing element in the check valve. In addition, the check valve rebounds once or several times before reaching its stationary end-of-travel position since the impact occurs in the form of partial elastic impact shocks caused by the elasticity of the dynamic system. This reduces the metering precision of the valve on one hand and on the other hand there is the danger of undue wear by micro-friction in the region of impact.

U.S. Pat. No. 4,964,391 discloses damping of the valve movement of a check valve for a fuel delivery system in combustion engines alone for its vibration reduction and for its reduction of pressure pulses; however, it is designed as a piston-cylinder unit that is connected to the valve element.

Another configuration of a check valve is described in SU-A-892084 wherein it is to be effective in the area of a flame-blocking connection and it uses for the purpose of damping of the closing shock a valve seat that is pretensioned by means if a spring. In addition, there are known from different patent documents, e.g. EP-A-0 195 261, EP-A-0 628 137, EP-A-0 628 137, WO91/03641 and EP-A-0 411 041, various movement and impact damping (buffer) devices in valves and also in fuel delivery systems, which influence impact surfaces, hydraulic buffers and elastic (resilient) connections of the moved masses.

It was the object of the present invention to provide a check valve controlled by differential pressure of the type mentioned in the beginning whereby the closing shock is damped in a manner whereby the closing element does not rebound even once or several times. An additional object of the invention was also the damping of the opening shock of a valve of this type. Another object was to provide a wear-resistant gaseous fuel injector consisting of a pilot valve and a check valve with a high degree of metering precision.

SUMMARY OF THE INVENTION

For the achievement of the first object, according to the invention, the closing element is provided with an additional mass that is greater than the mass of the closing element itself. Thereby acceleration of the valve element and the impact force remain low at both end-of-travel positions. The danger of wear by micro-friction (fretting) in the region of impact of the valve element and valve seat is thereby considerably reduced. Finally, recurring rebounding (one or more times) of the valve element from the valve seat before reaching the two stationary end-of-travel positions is avoided so that the metering precision of the check valve is substantially increased.

According to a special embodiment of the invention, the check valve is provided with a closing element which consists of a disk-shaped or mushroom-shaped segment cooperating with the valve seat and a stem attached thereon onto which a closing spring acts upon. For achievement of the present object, the embodiment is characterized in that the additional mass is designed as a projecting receiving element for the closing spring disposed at the end of the stem. Thereby an already existing element may be used to dampen the opening and closing shock without substantial enlargement of the necessary structural space.

According to an additional characteristic of the invention, at least one part of the added mass is coupled with the closing element via a damping ring so that during impact in the closed end-of-travel position of the check valve, the total impact energy does not have to be dissipated within the valve seat and whereby the modulus of elasticity of the damping ring is lower than the lower modulus of elasticity of the closing element and the additional mass.

According to an advantageous embodiment it is proposed that the closing element and the additional mass are made of steel and that the damping ring has a lower modulus of elasticity than the utilized steel.

To improve damping of the opening shocks and especially to avoid detrimental effects of the impact force, the check valve is characterized according to one of the above paragraphs in that at least one or each elastic deformable stop element made of reinforced synthetic material.

In a design modification of a check valve according to the invention, at least one impact element is designed as a stop ring embracing the valve stem onto which stop ring the receiving element for the closing spring makes contact in the open end-of-travel position of the check valve. The closing element consists of a disk-shaped or mushroom-shaped segment cooperating with the valve seat and a stem attached thereon onto which a closing spring acts upon, and whereby a projecting receiving element is provided at the end of the stem.

Not to exceed the permissible operating temperatures in the region of the parts designated for impact damping, which are preferably made of synthetic material, it is proposed according to an additional characteristic of the invention that the stop ring is fitted directly to a guide bushing for the stem whereby said guide bushing is made of highly heat-conducting material, preferably sintered bronze. Therefore the major portion of the heat transferred to the closing element of the check valve may be dissipated through the stem and the valve body.

Borings are provided around the guide bushing as passages for the medium to achieve additional cooling of the stem of the valve element.

The last object pertaining to a wear-resistant gaseous fuel injector with high metering precision is achieved with a configuration that, according to the invention, consists of a magnetically actuated pilot valve and a check valve controlled by differential pressure that is disposed downstream thereof and which is designed according to one of the above paragraphs.

In the following description and with reference to the accompanying drawing a preferred embodiment example of the invention is described in more detail.

BRIEF DESCRIPTION OF THE FIGURE

The accompanying FIGURE shows a longitudinal view through a gaseous fuel injector according to a preferred embodiment of the invention.

DETAILED DESCRIPTION OF THE PREFERRED EMBODIMENT

The illustrated gaseous fuel injector consists of an electromagnetically actuated metering valve 1, preferably a valve designed in a flat seat construction, having a seal element 2 with a substantially flat sealing surface, whereby the seal element 2 is lifted from its seat 3 preferably by means of a plunger magnet and is subsequently pushed against said seat 3 by a closing spring. Downstream from the seat 3 of the metering valve 1, which is preferably of a pressure-compensating design, there is provided a check valve 4 controlled by differential pressure, which opens up after opening of the metering valve 1 based on the applied gas pressure and it closes after closing of the metering valve 1 and after dropping of the applied pressure to a valve which associated force is able to overcome the force of the closing spring 6 that influences the closing element 5. The volume of the intermediate space is to be selected to be sufficiently small so that no undue large time lag develops between closing of the metering valve 1 and closing of the check valve 4.

The check valve 4 is preferably designed as a disk valve or a tappet valve as it is used in four-cycle engines. The gap cross-section is advantageously selected in a manner whereby the largest portion of the differential pressure influences the check valve 4 between the fuel delivery line and the combustion chamber and whereby it is guaranteed that the combustion fuel is injected with the best possible momentum, and thereby also with the greatest penetration depth. A substantially conical end piece 7 of the closing element 5 cooperates with a correspondingly shaped valve seat 8 against which the end piece 7 is pressed by the effect of the closing spring 6. The pulling action of the closing spring 6 is transmitted to the end piece 7 via the stem 9, which is axially movable in a guide bushing 10 so that the end piece 7 of the valve element 5 impacts exactly concentric on the conical valve seat 8 and thus wear by friction is avoided. In addition, a jet spoiler may be advantageously arranged downstream from the check valve 4 (not illustrated), which gives the exiting jet stream of combustion fuel a preferred direction.

At the upper end of the stem 9 of the valve element 5, which means the opposite side of the end piece 7, there is attached an additional mass 11 that functions as a receiving element for the closing spring 6. However, the additional mass 11 is greater, preferably substantially greater, than the mass of the closing element 5 of the check valve 4, which leads to a lower acceleration and thus to a lower impact force at the end-of-travel position of the closing element 5, and which means it leads to the desired damping of the impact force. The additional mass 11 is advantageously attached to the stem by a damping ring 12. The damping ring 12 is made of a material with a lower modulus of elasticity than the lower modulus of elasticity of the additional mass 1 and the stem 9. By manufacturing the additional mass 11 and the stem 9 preferably out of steel, the modulus of elasticity of the damping ring 12 should therefore be lower than the one of the utilized steel. The damping ring 12 effects thereby a separation of the mass that determines the impact load whereby only the low mass of the closing element 5 is a determining factor for the load of the valve seat 8 and the end piece 7—whereas the energy of the clearly larger additional mass 11 is dissipated through the damping ring 12.

The impact at the end-of-travel position is damped during opening of the check valve 4 by means of at least one elastic deformable stop element, preferably in the form of a stop ring embracing the stem 9. The stop ring 13 or each stop element is preferably made of reinforced synthetic material.

The check valve 4 is exposed to a very high temperature stress especially during the combustion phase. The transmitted heat, caused by the injection and the convection heat transfer onto the closing element 5, is transmitted only partly via the valve seat 8 to the valve body and from there to the cylinder block of the engine. The rest (of the heat) has to be dissipated through the stem 9. The guide bushing 10 of the stem 9 is made of a material with high heat transmission properties, preferably sintered bronze, so that the permissible operating temperature is not exceeded for the parts made of synthetic material used for impact damping. Additionally, cooling of the stem 9 may be achieved in that borings (not illustrated) are provided around the circumference of the guide bushing 10 through which the combustion fuel is diverted to the combustion chamber.

We claim:

1. A check valve which is controlled by differential pressure and which comprises:

a casing which defines a gas flow passageway and a discharge orifice having a valve seat therearound, a valve stem which extends along said flow passageway, an end piece at one end of said valve stem for contacting said valve seat, and an annular element at a second end of said valve stem, said annular element having a larger mass than a combined mass of said valve stem and said end piece, a damping ring positioned between said valve stem and a portion of said annular element, said damping ring having a lower modulus of elasticity than a modulus of elasticity of either said end piece or said annular element, and a closing spring which abuts said annular element to bias said valve stem along said flow passageway to move said end piece against said valve seat.

2. A check valve according to claim 1, wherein said closing spring and said annular element are made of steel and said damping ring has a lower modulus of elasticity than the utilized steel.

3. A check valve according to claim 1, including at least one elastic deformable stop element for said closing spring for limiting a stroke thereof in an opening direction.

4. A check valve according to claim 1, wherein each deformable stop element is made of reinforced synthetic material.

5. A check valve according to claim 4, wherein said end piece is disk-shaped or mushroom-shaped.

6. A check valve according to claim 5, wherein said stop ring is fitted directly to a guide bushing of said stem made of highly heat-conducting material.

7. A check valve according to claim 5, wherein borings are provided around said guide bushing functioning as passages for the medium.

8. A gaseous fuel injector consisting of a magnetically actuated pilot valve and a check valve controlled by differential pressure disposed downstream thereof which is designed according to claim 1.

* * * * *